United States Patent
Rodgers (10) Patent No.: US 10,842,323 B2
(45) Date of Patent: Nov. 24, 2020

(54) FOOD GREASE REDUCTION SYSTEMS AND METHODS

(71) Applicant: Bruce Rodgers, Energy, IL (US)

(72) Inventor: Bruce Rodgers, Energy, IL (US)

(*) Notice: Subject to any disclaimer, the term of this patent is extended or adjusted under 35 U.S.C. 154(b) by 250 days.

(21) Appl. No.: 15/717,712

(22) Filed: Sep. 27, 2017

(65) Prior Publication Data

US 2018/0092495 A1 Apr. 5, 2018

Related U.S. Application Data

(60) Provisional application No. 62/402,818, filed on Sep. 30, 2016.

(51) Int. Cl.
| | |
|---|---|
| *A47J 43/04* | (2006.01) |
| *B01D 33/00* | (2006.01) |
| *A47J 43/28* | (2006.01) |
| *A47J 43/24* | (2006.01) |

(52) U.S. Cl.
CPC ............. *A47J 43/284* (2013.01); *A47J 43/24* (2013.01)

(58) Field of Classification Search
CPC ........ A47J 43/24; A47J 19/027; A47J 43/046; A47J 37/1204; A47J 37/1223; A47J 37/047; A47J 43/04; A47J 43/284; A47J 43/00; B04B 5/0442; B04B 5/12; B01D 33/00
See application file for complete search history.

(56) References Cited

U.S. PATENT DOCUMENTS

| | | | |
|---|---|---|---|
| 3,827,985 | A | 8/1974 | De Haan |
| 5,317,964 | A | 6/1994 | Prudhomme |
| 5,490,453 | A | 2/1996 | Mackay |
| 7,337,712 | B1 | 3/2008 | Wang et al. |
| 7,866,259 | B2 | 1/2011 | Zaghloul et al. |
| 7,975,605 | B2 | 7/2011 | Wan et al. |
| 8,353,474 | B2 | 1/2013 | Holcomb et al. |
| 8,613,969 | B2 | 12/2013 | Barber et al. |
| 9,452,374 | B2 * | 9/2016 | Bernard ................ B01D 29/07 |
| 2009/0114104 | A1 | 5/2009 | Sawhney et al. |
| 2009/0220658 | A1 | 9/2009 | Al-Asaad |

FOREIGN PATENT DOCUMENTS

| | | |
|---|---|---|
| CN | 202035445 U | 11/2011 |
| DE | 202016001884 U1 | 6/2016 |
| GB | 2325178 A | 11/1998 |
| WO | WO-91/05502 A1 | 5/1991 |
| WO | WO-96/17541 A1 | 6/1996 |
| WO | WO-2011/041641 A1 | 4/2011 |
| WO | WO-2013/025988 A1 | 2/2013 |

* cited by examiner

*Primary Examiner* — Hong T Yoo
(74) *Attorney, Agent, or Firm* — Foley & Lardner LLP (57) ABSTRACT

Various embodiments relate to a manual centrifuge food processing device. An example device includes a bowl and a spindle extending from an inner surface of the bowl. A mesh basket is removably coupled to the bowl and is structured to receive a food product. The mesh basket defines a hub structured to receive the spindle so as to facilitate rotation of the mesh basket relative to the bowl about the spindle. A lid is removably coupled to the bowl. The lid includes a drive mechanism structured to rotate the mesh basket in response to a manual input so as to drive liquid from the food product due to centrifugal force. Each of the bowl and the mesh basket is formed of metal.

19 Claims, 10 Drawing Sheets

FOOD GREASE REDUCTION SYSTEMS AND METHODS

CROSS-REFERENCE TO RELATED PATENT APPLICATIONS

This application claims the benefit of priority from U.S. Provisional Application Ser. No. 62/402,818, filed Sep. 30, 2016, the content of which is incorporated herein by reference in its entirety.

BACKGROUND

The present disclosure relates generally to the field of food processing equipment used to extract fat and oil content from various food products. This type of processing device utilizes centrifugal force to drive grease away from the food. Food processing devices of this kind are generally commercial in nature and comprise a housing, a basket supported in the housing, a lid, and an electric drive mechanism for rotating the basket to process the food. There is a need for a centrifugal extraction device for removing fat and oil content from household food products, which is compact and adaptable for a consumer household use, manually operable, and allows for the consumer to easily dispose of the food byproduct after use.

SUMMARY

Various embodiments relate to a manual centrifuge food processing device. An example device includes a bowl and a spindle extending from an inner surface of the bowl. A mesh basket is removably coupled to the bowl and is structured to receive a food product. The mesh basket defines a hub structured to receive the spindle so as to facilitate rotation of the mesh basket relative to the bowl about the spindle. A lid is removably coupled to the bowl. The lid includes a drive mechanism structured to rotate the mesh basket in response to a manual input so as to drive liquid from the food product due to centrifugal force. Each of the bowl and the mesh basket is formed of metal.

Various other embodiments relate to a method of extracting liquid from a food product. An example method includes providing a bowl and inserting a spindle into the bowl. A mesh basket is placed inside of the bowl such that the spindle is received into a hub of the mesh basket. A food product is placed into the mesh basket. A lid is attached to the bowl. The lid includes a drive mechanism structured to rotate the mesh basket in response to a manual input provided to a manual lever of the drive mechanism so as to drive liquid from the food product due to centrifugal force. The manual lever is turned for a period of time so as to drive liquid from the food product.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

The present disclosure relates to a manual centrifuge food processing device used to extract fluids (e.g., grease, fat, oil, etc.) from food by centrifugal force. The device is structured for home use to allow excess grease to be extracted from cooked foods through the use of centrifugal force. Generally, manual centrifuge food processing devices (e.g., salad spinners) are formed of a plastic or polymer suitable for home use to remove excess water from various uncooked food products (e.g., salad). After preparing various cooked food products (e.g., meats), the grease or oil contained in the food may be hot and therefore undesirable to come into contact with a plastic manual centrifuge food processing device, because the heat will warp or alter the plastic or polymer food filter device. Therefore, it is desirable to have a manual centrifuge food processing device adaptable for home use with food that contain hot oils or grease that is made of material that allows for safe contact with the hot grease or oil. The parts of the appliance that come in direct contact with the fried foods, hot grease, or oil may be constructed of metal in order to prevent warping, cracking, or melting of parts while avoiding prevalent health concerns associated with many plastic materials. Additionally, it would be beneficial to have these parts be dishwasher safe.

Figure 1:
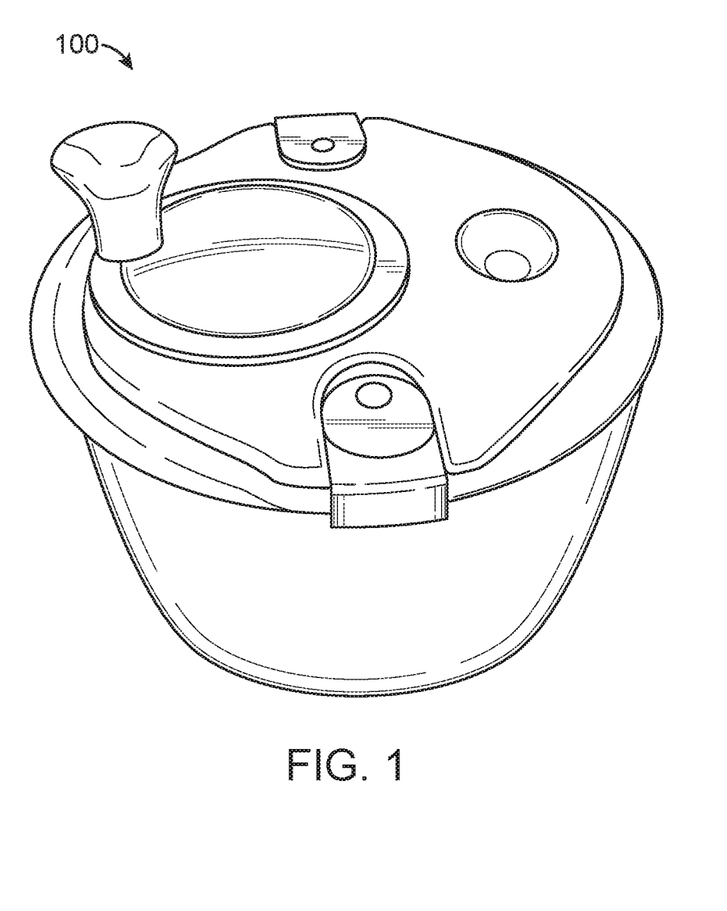
FIG. 1 is a perspective view of a centrifugal food processing device, according to an example embodiment.

FIG. 1 is a perspective view of a manual centrifuge food processing device 100, according to an example embodiment. According to various embodiments, the device 100 uses centrifugal force in order to remove fluid from food products. More specifically, the device 100 is structured to remove grease or oil from various cooked food products so as to reduce the grease or oil content of the food products. In particular, the device 100 is structured to remove grease or oil from hot food products without deforming or otherwise damaging the device 100. As used herein, the term "hot" refers to a temperature of at least 200 degrees F. For example, in one implementation, the device 100 may be used to remove grease from freshly cooked ground beef. As will be appreciated, the device 100 is structured to impart centrifugal force on a food product placed therein, such as via manual input.

Figure 2:
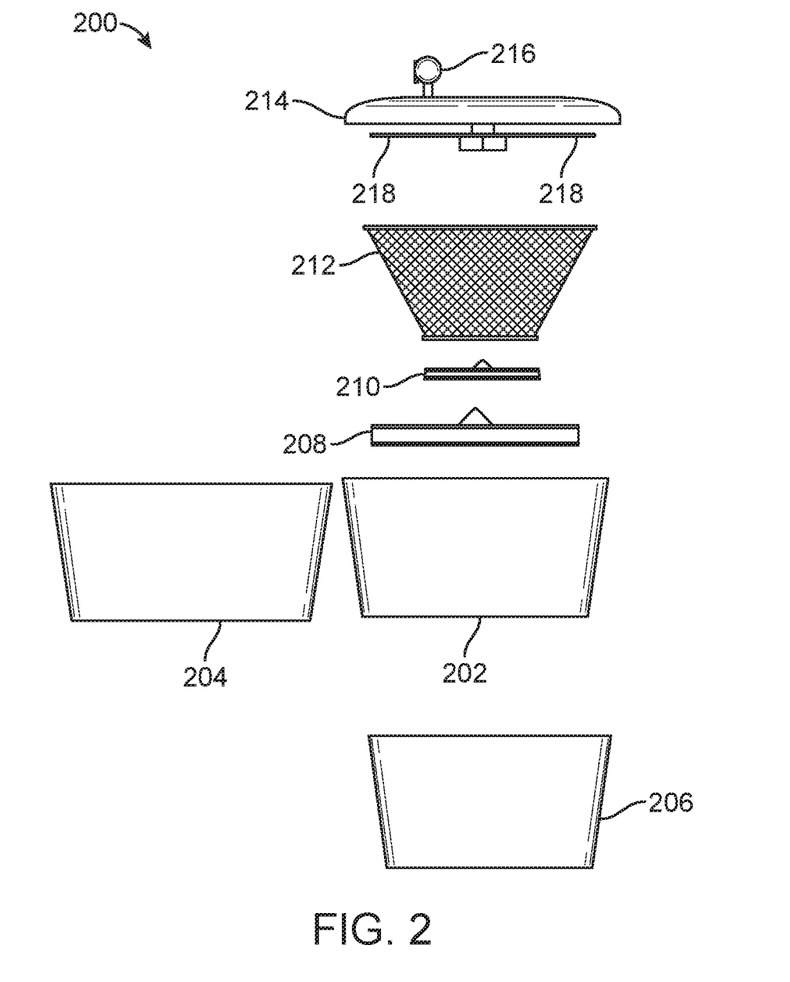
FIG. 2 is an exploded perspective view of the device of FIG. 1.

FIG. 2 is an exploded perspective view of the device 100 of FIG. 1. As illustrated in FIG. 2, the device 100 includes a bowl 202, an insulator 204, a liner 206, spindle 208, a basket base portion 210, a mesh basket 212, and a lid 214.

The bowl 202 is a unitary, one piece structure. In some embodiments, the bowl 202 is formed of metal (e.g., stainless steel or aluminum) or another heat-resistant material (e.g., glass, polymer, etc.). The bowl is open at the top and defines an interior portion.

In one embodiment, the insulator 204 is coupled to an exterior surface of the bowl 202. The insulator 204 surrounds the bowl 202 and is structured to insulate the bowl 202 from the heat transferred to the bowl 202 from the hot cooked food product therein. In some embodiments, the insulator 204 is made of silicone or another similar material and may be configured as to be permanently or removably coupled to the bowl 202. In some embodiments, the insulator 204 is formed integrally with the bowl 202.

The liner 206 is structured to fit inside of the bowl 202. More specifically, the liner 206 is structured to be removably coupled to the bowl 202 between a bottom surface of the bowl 202 and the mesh basket 212. The liner is structured to collect liquid (e.g., grease) driven from food product in the mesh basket 212. In some embodiments, the liner 206 is structured to as to extend at least partially up sidewalls of the bowl 202 so as to capture the liquid driven radially outward from the food product.

A spindle 208 is positioned inside the bowl 202, extending from an inner surface of the bowl 202. The spindle 208 is structured to facilitate rotation of the mesh basket 212 relative to the bowl 202. The spindle 208 is removably coupled to the bowl 202. The spindle 208 is structured to fit within and at the bottom of the bowl 202 to receive the mesh basket 212. In some embodiments, the spindle 208 is formed integrally with the bowl 202. In other embodiments, the spindle 208 is removable. As described in further detail in connection with FIG. 6, the spindle 208 is part of a pivot that includes the spindle 208 and a base.

The basket base portion 210 is structured to be securely coupled to the mesh basket 212 and to receive the spindle 208 within the bowl 202. In some embodiments, the basket base portion 210 is integrally formed with the mesh basket 212 as one unitary part. In other embodiments, the basket base portion 210 is removably coupled to the mesh basket 212. The basket base portion 210 defines a hub structured to receive the spindle 208 so as to facilitate rotation of the mesh basket 212 relative to the bowl 202 about the spindle 208. In some embodiments, the spindle 208 is an opening formed in the basket base portion 210. In other embodiments, the spindle 208 is a recessed portion formed in the basket base portion 210.

The mesh basket 212 is removably and rotatably coupled to the bowl 202. The mesh basket 212 is structured to receive a food product. In some embodiments, the mesh basket 212 is formed of a material, such as a metal, that is structured to receive a cooked food product without causing deformation or structural damage to the mesh basket 212.

The lid 214 is removably coupled to the bowl 202 and operatively coupled to the mesh basket 212. The lid 214 includes a drive mechanism including a manual lever 216 to operatively rotate the mesh basket 212. In some embodiments, the drive mechanism includes a drive sprocket 218 structured to engage the mesh basket 212 to transfer energy from the manual lever 216 to the mesh basket 212. In some embodiments, the drive sprocket 218 is structured so as to engage holes in the mesh metal material of the mesh basket 212. In other embodiments, the drive sprocket 218 is structured to engage a drive element of the mesh basket 212. For example, in some embodiments, the drive element includes openings sized and spaced so as to receive the drive sprocket 218. In other embodiments, the drive sprocket 218 does not include teeth like a typical sprocket, but instead includes a roller that engages the mesh basket 212 by friction. In other embodiments, the drive sprocket 218 engages tabs or splines of the mesh basket 212.

Figure 3:
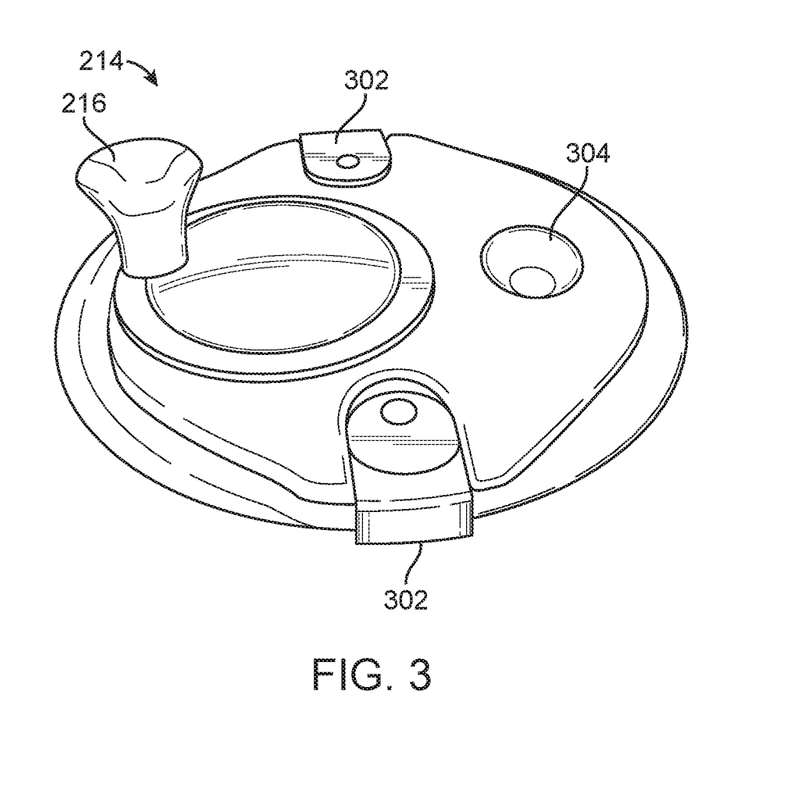
FIG. 3 is a top perspective view of a lid of the device of FIGS. 1 and 2.

FIG. 3 is a top perspective view of the lid 214, as shown in FIG. 2, including the manual lever 216. The lid 214 fits snugly on top of the bowl 202 such that the drive mechanism of the lid 214 engages the mesh basket 212. In some embodiments the lid 214 includes a locking mechanism 302 structured to removably and selectively fixedly couple the lid 214 to the bowl 202. In some embodiments, the locking mechanism 302 is further structured to removably and selectively fixedly couple the lid 214 to the mesh basket 212. The locking mechanism 302 is structured to prevent spillage in the event of the device 100 overturning. In some embodiments, the lid 214 includes a vent 304 as to allow the escape of steam resulting from operation of the device 100.

Figure 4:
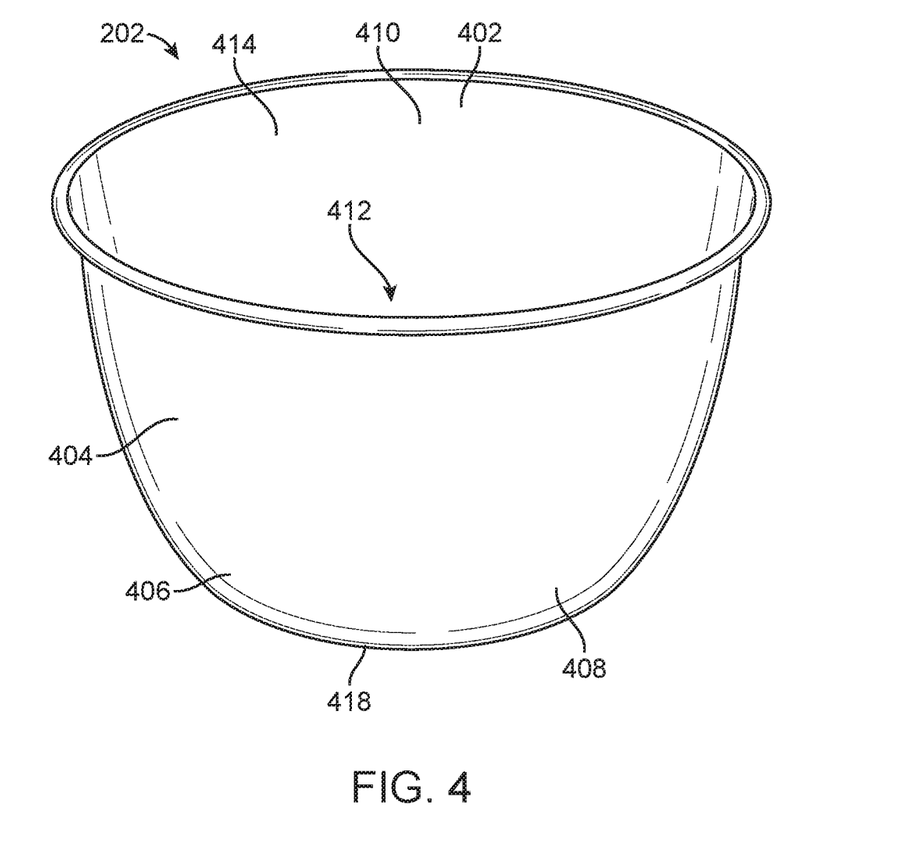
FIG. 4 is a front perspective view of a bowl of the device of FIGS. 1 and 2.

FIG. 4 is a front perspective view of the bowl 202 shown in FIG. 2. The bowl 202 defines an opening 402, and includes sidewalls 404 that extend downward to a base 408. The bowl 202 defines an interior surface 410 and an exterior surface 406. In some embodiments, the exterior surface 406 defined by the sidewalls 404 and the base 408 is generally concave. The interior surface 410 defines a bottom surface 412 and interior wall 414 surfaces extending therefrom to define a rim 416. The rim 416 is structured to be coupled to the locking mechanism 302 so as to secure the bowl 202 to the lid 214. The bowl 202 is structured to receive various components of the device 100 (e.g., the spindle 208, the mesh basket 212, and the basket base portion 210), and cooked food product. For example the cooked food product may be inserted into the mesh basket 212 via the opening 402 of the bowl 202.

In some embodiments, the bowl 202 further includes a support ring 418 coupled to the bowl 202 on the exterior surface 406 thereof proximate and/or on the base 408 as to restrict to movement of the device 100 that may result during use.

Figure 5:
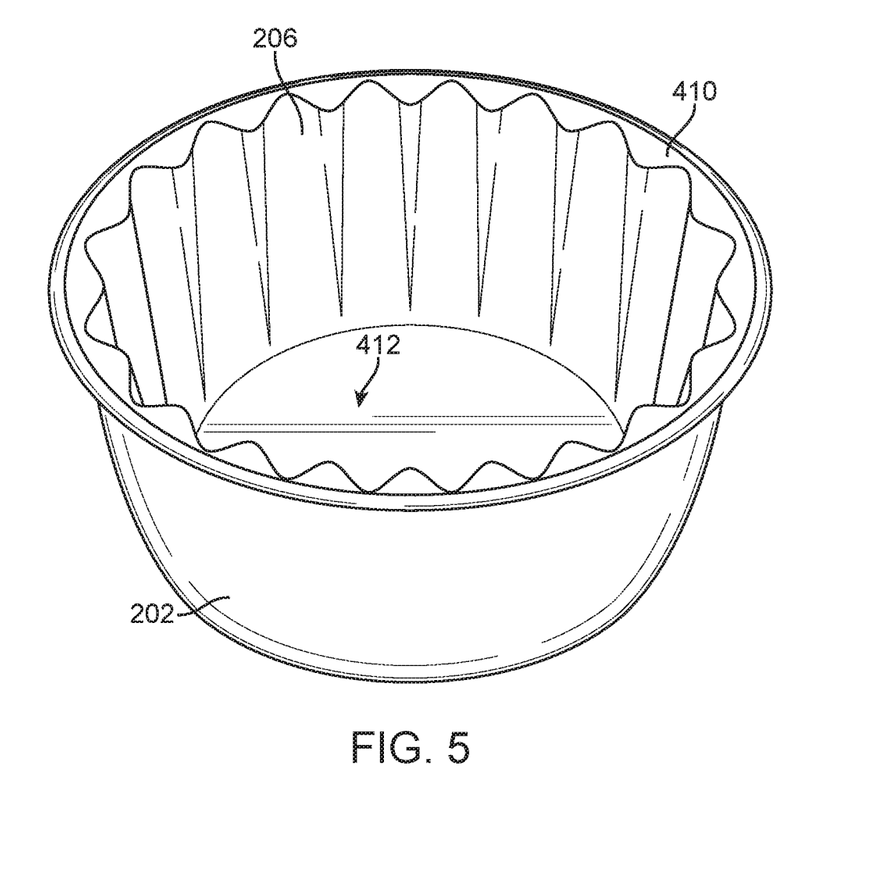
FIG. 5 is a top perspective view of the bowl of FIGS. 1, 2, and 4, including a liner positioned therein.

FIG. 5 is a top perspective view of the bowl 202 containing the liner 206 positioned therein for convenient removal of fluid (e.g., grease, oil, other by-products, etc.) extracted from a food product by use of the device 100. In some embodiments, the liner 206 rests congruently with the interior surface 410 and the bottom surface 412 beneath the spindle 208, and extends upward along the interior surface 410 to the rim 416 of the bowl 202. Generally, the liner 206 intercepts the grease, oil, and other byproduct resulting from operation of the device 100 which would have otherwise come into contact with the bowl 202 during use and would need to be cleaned from the bowl 202 after use. According to an embodiment, the liner 206 may cover only the bottom surface 412 as to allow grease, oil, or other byproduct to drain down the interior surface 410 of the sidewalls 404 of the bowl 202. The fluid is ultimately collected by the liner 206, which can then be removed and disposed of. In another embodiment the liner 206 may cover the bottom surface 412 and extend only partially up the interior surface 410.

In some embodiments, the liner 206 is made of paper or any material that does not cause a harmful health effect when coming in contact with the hot grease or oil. In some embodiments, the liner 206 can be disposable and replaceable or of a material that can be cleaned and reused. In some embodiments, the liner 206 is made of a material structured to absorb grease or other fluids.

Figure 6:
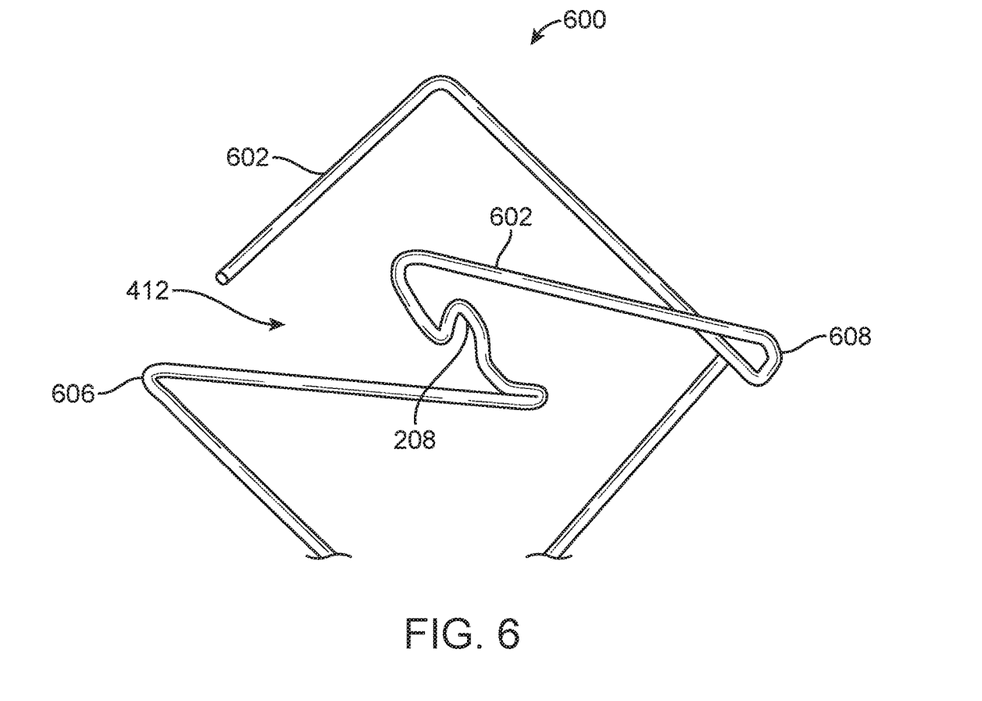
FIG. 6 is a top view of a pivot of the device of FIGS. 1 and 2.

FIG. 6 is a top view of an example of a pivot 600 including the spindle 208 and a base 602. The pivot 600 projects outwardly from the base 602. The base 602 comprises arms 604 extending to the spindle 208. The arms 604 are structured to support the pivot 600 against the bottom surface 412 of the bowl 202. The arms 604 define outer edges 606, 608 that sit circumferentially within the bottom surface 412 of the bowl 202. In some embodiments, the arms 604 are structured to engage slots (not shown) on the bowl 202 so as to prevent rotation of the pivot 600 relative to the bowl 202. Generally, the pivot 600 is formed of incompressible material, such as stainless steel, capable of structurally withstanding temperatures resulting from cooked food product.

The spindle 208 is structured to receive the hub of the basket base portion 210 of the mesh basket 212 of FIG. 2 so as to facilitate rotation of the mesh basket 212 within the bowl 202 with minimum resistance. The spindle 208 extends from the base 602 so as to define a spindle height. The spindle height is sized so as to allow for the basket base portion 210 and the mesh basket 212 to freely rotate within the bowl 202 such that the basket base portion 210 and the mesh basket 212 do not come into contact with any parts of the bowl 202 or the liquid (e.g., grease) and/or filtered food particles that collect beneath.

In some embodiments, the spindle 208 is formed integrally with the bowl 202 and is structured to receive the basket base portion 210 and the mesh basket 212. For example, the bowl 202 is formed such that the spindle 208 is an integrally raised center point inseparable from the bowl 202.

In some alternative embodiments, the pivot 600 includes a bowl-shaped housing defining a base. The base is structured to support the pivot 600 against the bottom surface 412 of the bowl 202. The base defines the spindle 208 and removal apertures. The spindle 208 is formed in the base (e.g., via a stamping process), and extends into an interior portion of the bowl-shaped housing. In some embodiments, the spindle 208 is generally cone-shaped. The removal apertures are formed in the base to aid a user in removing the pivot 600 from the bowl 202. The removal apertures are sized so as to accommodate human fingers. In some embodiments, the removal apertures also facilitate drainage of grease into the bowl 202.

Figure 7:
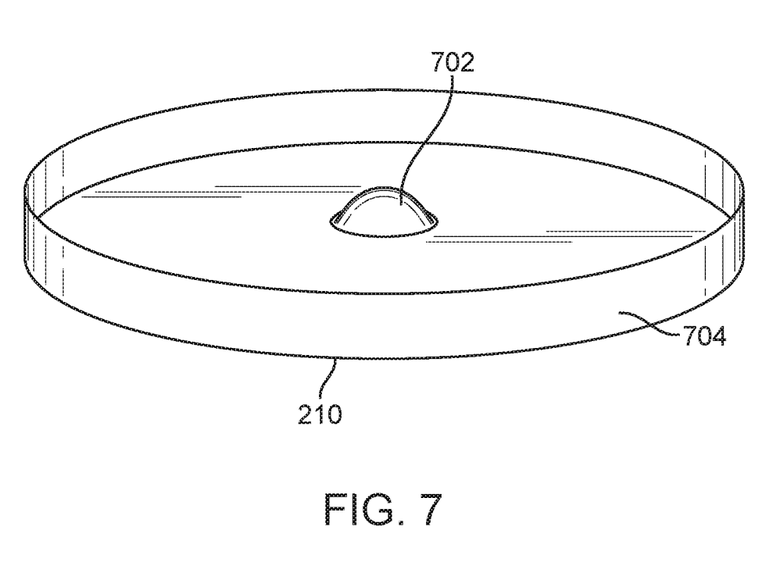
FIG. 7 is a front perspective view of a basket base portion of the device of FIGS. 1 and 2.

FIG. 7 is a front perspective view of the basket base portion 210, according to an embodiment. The basket base portion 210 defines a hub 702 located at the center of the basket base portion 210. The hub 702 is structured to receive the spindle 208. In some embodiments, the hub 702 is an indented portion of the basket base portion 210 as illustrated in FIG. 7. In other embodiments, the hub 702 is an opening formed in the basket base portion 210. The basket base portion 210 includes a circumferential side wall 704 to facilitate coupling of the basket base portion 210 to the mesh basket 212. In some embodiments, the basket base portion 210 is coupled to the mesh basket 212 via a snap connection. The hub 702 is structured such that it is sufficiently indented as to receive the spindle 208, but not so indented that the hub 702 comes into contact or protrudes into the bottom of the mesh basket 212. In some embodiments, the basket base portion 210 is cone-shaped.

Figure 8:
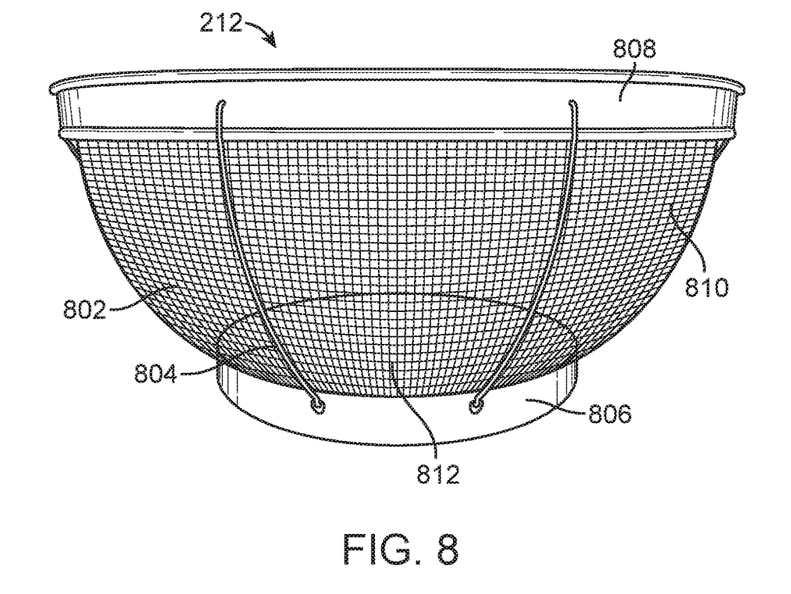
FIG. 8 is a side view of the a mesh basket of the device of FIGS. 1 and 2.

FIG. 8 is a side view of the mesh basket 212 having a mesh structure 802 formed on a wire frame 804. The wire frame 804 extends outward and radially upward from a base ring 806 to a top ring 808. The mesh structure 802 around the mesh wall 810 and mesh base 812 of the mesh basket 212 is sized and shaped so as to be large enough to allow grease or oil to flow through the mesh structure 802, but small enough to prevent cooked food from passing through. In some embodiments, the top ring 808 is engaged by the drive mechanism of the lid 214 by way of friction or by contact with the parts of the spinning mechanism.

Figure 9:
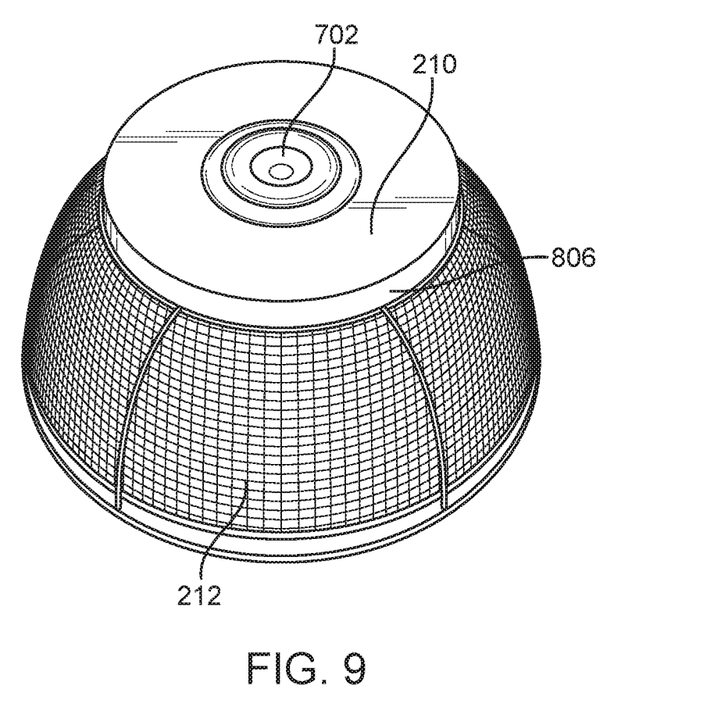
FIG. 9 is a bottom perspective view of a base plate connected to the mesh basket of FIG. 8.

FIG. 9 is a bottom perspective view of the mesh basket 212 connected to the basket base portion 210. The base ring 806 of the mesh basket 212 is slightly smaller than the basket base portion 210 such that the circumferential side wall 704 of the basket base portion 210 has a snug fit and snap connection to the base ring 806. In some embodiments, the hub 702 of the basket base portion 210 is position in the center of the basket base portion 210 as to receive the spindle 208, as shown in FIG. 2. In other embodiments, the mesh basket 212 and the basket base portion 210 are a single, integrally formed part.

Figure 10:
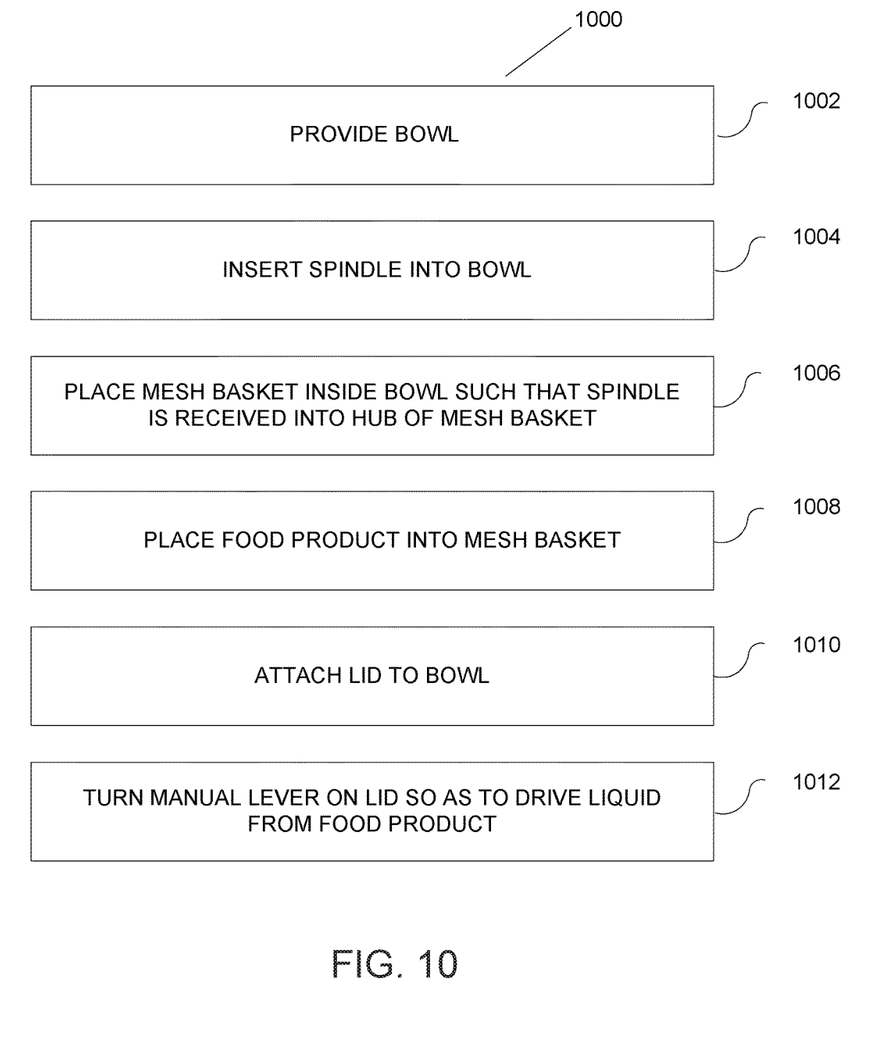
FIG. 10 is a flow diagram of a method of extracting fat and oil from a food product.

FIG. 10 is a flow diagram illustrating a method 1000 of extracting grease or oil from a food product via centrifugal force. In some embodiments, method 1000 is implemented by the device 100 of FIG. 1.

At 1002, a bowl is provided by a user. For example, the bowl may be the bowl 202 of FIG. 1. In some embodiments, components of the device 100 are stored in the bowl 202. The user removes the lid 214 along with all of the components (e.g. the liner 206, the spindle 208, the basket base portion 210, and the mesh basket 212) contained in the bowl 202.

At 1004, the user inserts the spindle 208 into the bowl 202. In some embodiments, the liner 206 is first placed in the middle of the bowl 202 and pressed downward and outward so as to come into contact with the interior surface 410 and bottom surface 412 of the bowl 202. In some embodiments, the liner 206 is structured to be roughly the size of the bottom surface 412 of the bowl 202 and should be placed in the center of the bottom surface 412 to collect the grease, oil, or by-product resulting from operation of the device 100.

At 1006, the user places the mesh basket 212 inside of the bowl 202. For example, the spindle 208 is placed in the center of the bottom surface 412 of the bowl 202 on top of the liner 206, and the mesh basket 212 placed on top of the spindle 208 such that the spindle 208 is received into the hub 702 of the mesh basket 212. In some embodiments, the spindle 208 is integrally formed with the bowl 202 as one unitary piece and the mesh basket 212 connected to the basket base portion 210 is then placed on top of the spindle 208 as to come into contact with the hub 702. In other embodiments the mesh basket 212 and basket base portion 210 are integrally connected as one unitary part which is then placed on the center of the spindle 208.

At 1008, a food product is placed into the mesh basket 212. For example, the food product (e.g. ground beef) is cooked by way of heating the food product and the cooked food product is then transferred immediately from the cooking device into the mesh basket 212 contained in the device 100. In other embodiments, the cooked food product may be placed into the mesh basket 212 after the food product has cooled.

At 1010, the lid 214 is attached to the bowl 202. The lid 214 includes a drive mechanism structured to rotate the mesh basket 212 in response to a manual input provided to a manual lever 216 of the drive mechanism so as to drive liquid from the food product due to centrifugal force. In some embodiments, the lid 214 is fixedly secured to the rim 416 of the bowl 202 by actuating a locking mechanism 302 of the lid 214. The lid 214 may be removed from the bowl 202 by deactivating the locking mechanism 302.

At 1012, the user turns the manual lever 216 for 30-60 seconds such that the mesh basket 212 rotates within the bowl 202 imparting a centrifugal force on the cooked food product which in effect drives grease, oil, and other contents away from the food product through the mesh structure 802 of the mesh basket 212 into the bowl 202.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a bowl;
   a spindle extending from an inner surface of the bowl and integrally formed with the bowl;
   a mesh basket removably coupled to the bowl and structured to receive a food product, the mesh basket defining a hub structured to receive the spindle so as to facilitate rotation of the mesh basket relative to the bowl about the spindle; and
   a lid removably coupled to the bowl, the lid including a drive mechanism structured to rotate the mesh basket in response to a manual input so as to drive liquid from the food product due to centrifugal force,
   wherein each of the bowl and the mesh basket is formed of metal.

2. The apparatus of claim 1, wherein the mesh basket and the bowl are configured to accept the food product, the food product being a hot food product of at least 200 degrees F.

3. The apparatus of claim 1, further comprising an insulator removably coupled to the bowl and surrounding an outer surface of the bowl, the insulator configured to reduce the rate of heat transfer between the food product in the bowl to the surrounding environment outside of the bowl, wherein the food product is at least 200 degrees F.

4. The apparatus of claim 1, further comprising a liner structured to be removably coupled to the bowl between a bottom surface of the bowl and the mesh basket, the liner structured to collect the liquid driven from the food product.

5. The apparatus of claim 4, wherein the liner is structured to absorb grease.

6. The apparatus of claim 4, wherein the liner is structured to extend at least partially up sidewalls of the bowl so as to capture the liquid driven radially outward from the food product.

7. The apparatus of claim 1, further comprising a pivot, the pivot comprising a base and the spindle extending from the base.

8. The apparatus of claim 7, wherein the mesh basket comprises a basket portion and a basket base portion removably coupled to the basket portion, the basket base portion defining the hub.

9. The apparatus of claim 7, wherein the base comprises arms structured to support the pivot against the inner surface of at least a portion of the bowl.

10. The apparatus of claim 9, wherein the arms are structured to engage slots on the bowl so as to prevent rotation of the pivot relative to the bowl.

11. The apparatus of claim 1, wherein the lid comprises a locking mechanism structured to removably and selectively fixedly couple the lid to the bowl.

12. The apparatus of claim 11, wherein the locking mechanism is further structured to removably and selectively operatively couple the lid to the mesh basket.

13. The apparatus of claim 1, wherein the lid further comprises a vent structured to release steam from inside of the bowl.

14. The apparatus of claim 13, wherein the vent is sized so as to prevent food particles from escaping through the vent.

15. The apparatus of claim 1, wherein each of the bowl and the mesh basket is made of stainless steel.

16. An apparatus, comprising:
    a bowl;
    a spindle extending from an inner surface of the bowl, the spindle integrally formed with the bowl;
    a mesh basket removably coupled to the bowl and structured to receive a food product, the mesh basket defining a hub structured to receive the spindle so as to facilitate rotation of the mesh basket relative to the bowl about the spindle; and
    a lid removably coupled to the bowl, the lid including a drive mechanism structured to engage and rotate the mesh basket in response to a manual input;
    wherein each of the bowl and the mesh basket is formed of metal.

17. The apparatus of claim 16, further comprising a liner positioned between the bowl and the mesh basket, the liner structured to extend along an interior surface of the bowl and to a rim of the bowl.

18. The apparatus of claim 16, wherein the drive mechanism comprises:
   a drive sprocket structured to engage the mesh basket;
   wherein a manual lever is structured to receive a manual input so as to rotate the drive sprocket and the mesh basket.

19. The apparatus of claim 16, wherein the drive mechanism engages a top ring of the mesh basket.

* * * * *